July 31, 1951 L. J. DE VORSEY 2,562,417
ANIMAL TRAP
Filed March 23, 1949 2 Sheets-Sheet 1
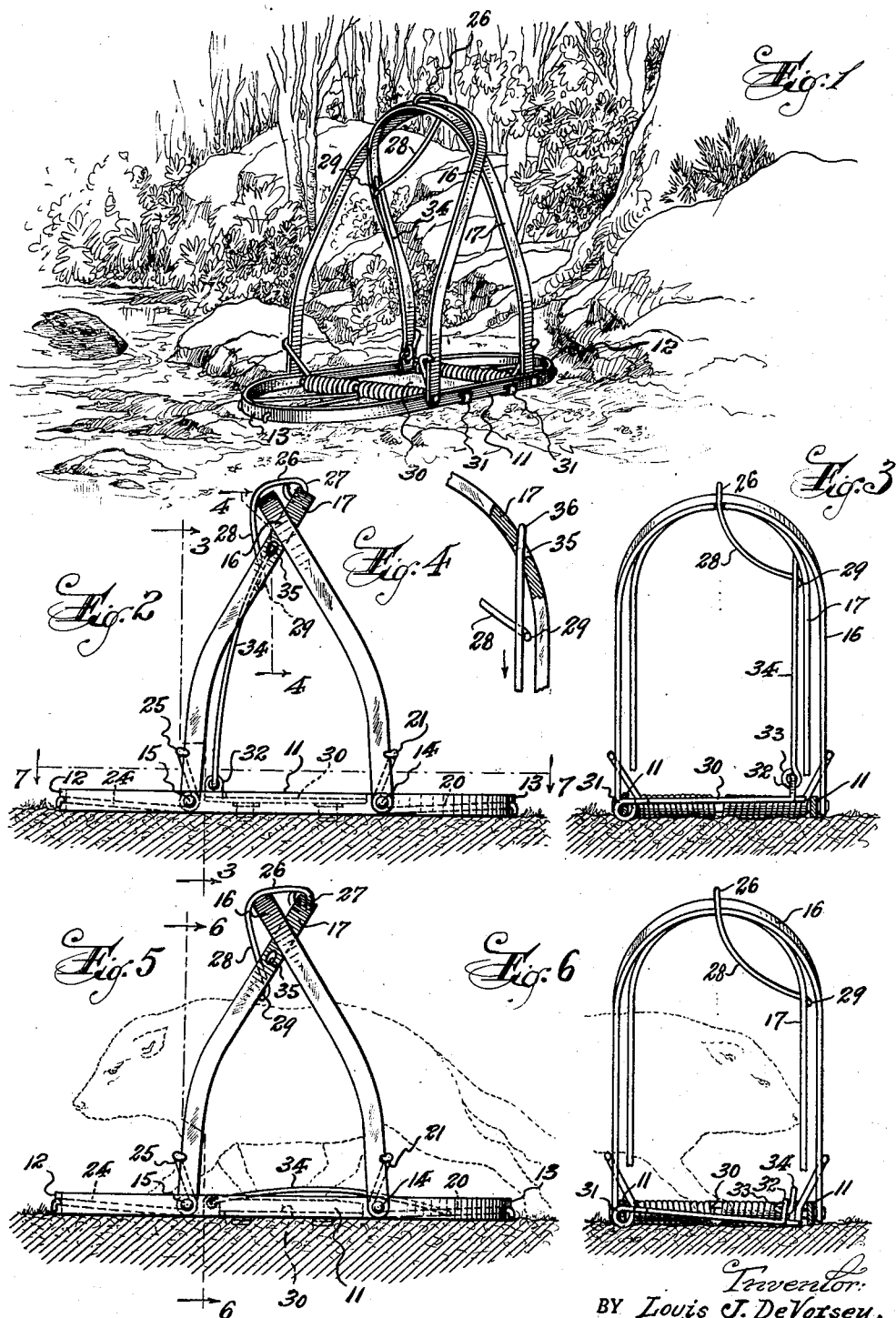
Inventor:
Louis J. DeVorsey,
BY George L. Richards
Attorney.

July 31, 1951 — L. J. DE VORSEY — 2,562,417
ANIMAL TRAP
Filed March 23, 1949 — 2 Sheets-Sheet 2
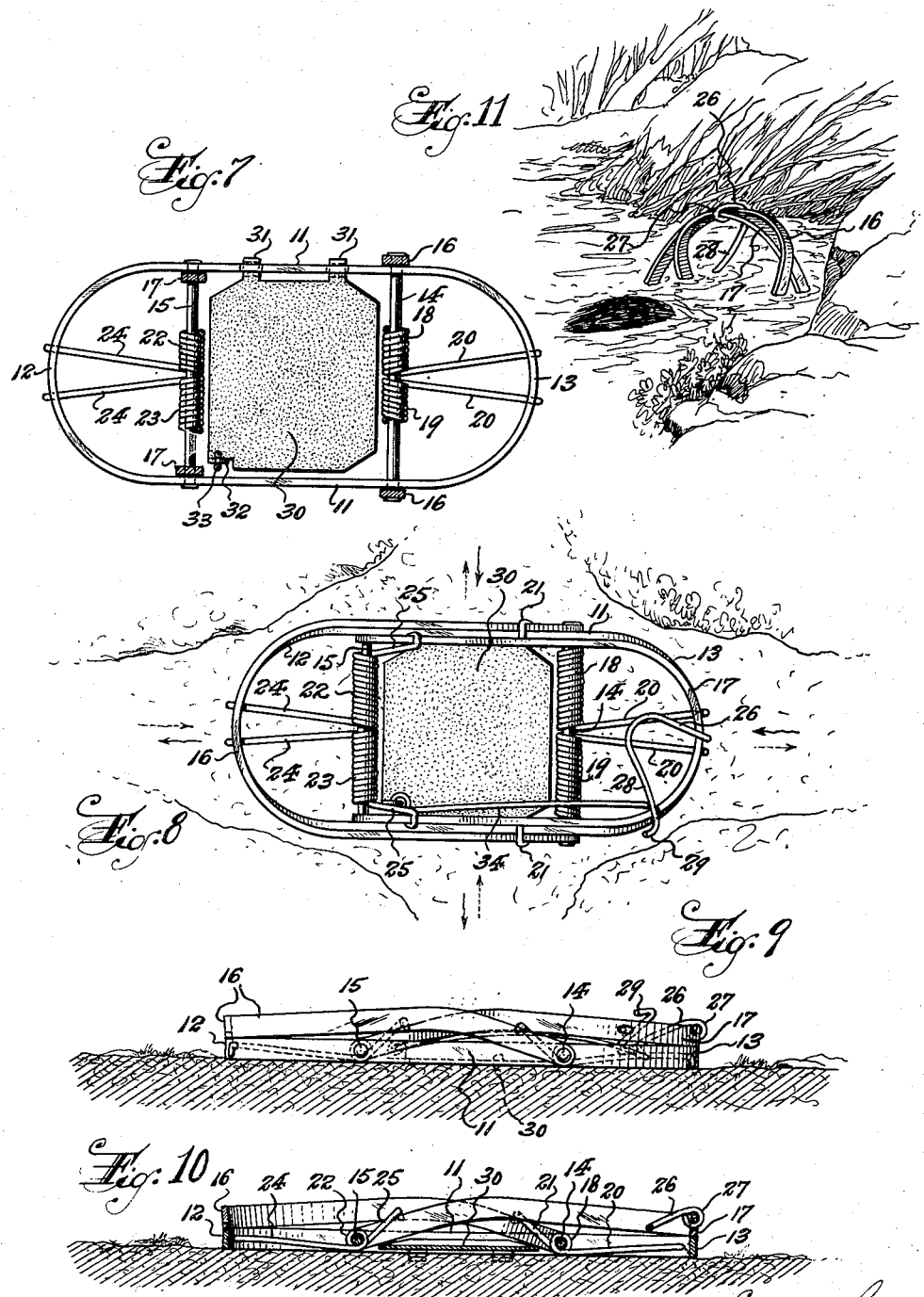
Inventor:
Louis J. DeVorsey,
BY George D. Richards
Attorney.

Patented July 31, 1951

2,562,417

UNITED STATES PATENT OFFICE 2,562,417

ANIMAL TRAP

Louis J. De Vorsey, Lyndhurst, N. J.

Application March 23, 1949, Serial No. 83,070

1 Claim. (Cl. 43—81)

This invention relates to a device for trapping animals, and more particularly, small fur bearing animals.

The invention comprises a novel animal trap structure adapted for optional use either on ground surface or under water. The trap structure is provided with opposed, spring actuated trapping jaws which are pivotally supported by a base. The trapping jaws are of U-shape and so spaced, in pivotally connected relation to the base, as to provide, when erected in trap set condition, unobstructed passageway through the trap both longitudinally and transversely thereof, so that trapping of an animal is assured irrespective of which direction the animal approaches and enters the trap. Means are provided whereby the trapping jaws may be set in non-trippable or trippable condition, so that, when set in the former condition, animals may pass back and forth therethrough without sensing any danger, thus becoming accustomed to its presence and thus caused to lose fear thereof; whereafter the trap may be set in trippable condition with vastly greater likelihood of making a catch. The trap structure includes novel tripping means whereby the animal releases the trapping jaws upon entering the trap; this means comprises a pivoted pan of substantial area, to which is connected a trigger rod adapted to be releasably engaged with a set trapping jaw, subject to withdrawal from the latter upon depression of the pan by weight of a trap entering animal, said trigger rod being adapted to releasably engage detent means by which the trapping jaws are held in set condition. The trigger rod is so arranged as not to impede passage of the animal into the trap either from the ends or sides of the latter, and when the trigger rod is released it will swing clear of the trap without frightening or pushing the animal out of the trap. The pan is of such extended area as to assure animal contact therewith, since it is large enough that should an entering animal overstep the same with its fore feet it will nevertheless engage the same with its hind feet, and thus assure tripping of the trapping jaws. The novel trap of this invention does not require bait, and the tripping of the trapping jaws does not depend upon an animal tugging at bait. Bait may be placed under the trap, however, whereby to attract an animal by the odor thereof.

An illustrative embodiment of the invention is shown in the accompanying drawings, in which:

Fig. 1 is a perspective view of the trap according to this invention as set in trippable condition for use.

Fig. 2 is a side elevational view of the trap as set in trippable condition for use; Fig. 3 is a transverse vertical section therethrough, taken on line 3—3 in Fig. 2; and Fig. 4 is a fragmentary detail sectional view, enlarged, taken on line 4—4 in Fig. 2.

Fig. 5 is a side elevational view of the trap as set in non-trippable condition; Fig. 6 is a transverse vertical section therethrough, taken on line 6—6 in Fig. 5; and Fig. 7 is a horizontal sectional view of the same, taken on line 7—7 in Fig. 2.

Fig. 8 is a plan view of the trap in sprung condition; Fig. 9 is a side elevational view thereof; and Fig. 10 is a longitudinal central section therethrough.

Fig. 11 is a pictorial view showing the trap as disposed for use under water.

Similar characters of reference are employed in the hereinabove described views, to indicate corresponding parts.

Referring to the drawings, the base of the trap is formed from a metallic strip which is bent upon itself and joined to provide a hollow elongated base frame 11, preferably shaped to form semi-circularly curved opposite end portions which respectively provide stationary trapping jaws 12 and 13 at its respective ends.

Fixed in and extending between the sides of the base frame 11, respectively inwardly of the respective stationary trapping jaws 12 and 13 thereof, are transverse fulcruming rods or shafts 14 and 15.

The trap is provided with a pair of movable trapping jaws 16 and 17, respectively of U-shape. The legs of the movable trapping jaw 16 are disposed to extend contiguous to the outer faces of the sides of the trap frame; end portions of said legs being pivotally connected with and supported by the fulcruming rod or shaft 14. Said movable trapping jaw 16 extends from such pivotal connection with the base frame 11 toward the stationary trapping jaw 12 of said base frame, being adapted, when downswung, to close upon the latter. The legs of the movable trapping jaw 17 are disposed to extend contiguous to the inner faces of the sides of the trap frame; end portions of the legs being pivotally connected with and supported by the fulcruming rod or shaft 15. The movable trapping jaw 17 extends from its said pivotal connection with the base frame 11 toward the stationary trapping jaw 13 of said base frame, being adapted, when down swung, to close upon the latter. As thus respectively connected with the base frame 11, when the movable trapping jaws 16 and 17 are up swung to a trap setting position, the free end portion of the movable trapping jaw 17 will extend through the free end portion of the movable trapping jaw 16, so that said end portions of the movable trapping jaws will intersectingly cross one another, and so that each is free for up and down swinging movements without interfering one with the other.

Mounted around the rod or shaft 14 are a pair of strong torsional springs 18 and 19. The inner arm 20 of each spring 18 and 19 is extended to and suitably anchored in connection with the base frame 11, while the outer arm 21 of each said spring is suitably engaged with an adjacent leg of the movable trapping jaw 16, whereby said springs exercise strong tensional thrust upon the latter which is operative to yieldably urge the same to a closed or animal trapping or gripping relation to the stationary trapping jaw 12 of the base frame 11.

Similarly, mounted around the rod or shaft 15 are a like pair of strong torsional springs 22 and 23. The inner arm 24 of each spring 22 and 23 is extended to and suitably anchored in connection with the base frame 11, while the outer arm 25 of each said spring is suitably engaged with an adjacent leg of the movable trapping jaw 17, whereby the springs exercise strong torsional thrust upon said trapping jaw 17 which is operative to yieldably urge the same to a closed or animal trapping or gripping relation to the stationary trapping jaw 13 of the base frame 11.

A holding or detent means is provided for setting the movable trapping jaws 16 and 17 in upswung erected or set position relative to the base frame 11. Said holding or detent means is adapted to be optionally arranged to hold the erected and set movable trapping jaws in either a non-trippable condition or in a trippable condition. In the latter case, the holding or detent means is cooperative with a tripping means adapted to be released by the weight of an animal which enters the trap.

The holding or detent means comprises a tie hook element 26 which is pivotally connected by an eye 27, or other suitable pivoting means, to one of the movable trapping jaws, as e. g. the jaw 17; said hook element having an elongated free end portion 28 which terminates in a hook-like bill 29. When it is desired to utilize the holding or detent means to hold the erected and set movable trapping jaws in non-trippable condition, so as to permit movement of an animal back and forth through the inert trap, whereby to habituate the animal to the presence of the trap and thus dispel fear of the latter, the tie hook element 26, as pivotally connected with the movable tripping jaw 17 is engaged across the adjacent upraised end of the movable tripping jaw 16, and thereupon the elongated free end portion 28 of the tie hook element is disposed to extend back across the outer face of the leg of said jaw 17, with its hook-like bill 29 hooked around the under edge of the latter. When thus disposed, the holding or detent means functions to tie the up swung movable tripping jaws 16 and 17 in mutually secured together relation against down swing under thrust of their actuating springs; thus holding the movable jaws inert until the holding or detent means is manually released (see Figs. 5 and 6).

The tripping means with which the holding or detent means may be engaged when it is desired to render the erected and set movable trapping jaws of the trap trippable for trapping action comprises a platform or pan 30. This platform or pan 30 is pivotally connected with one side of the base frame 11 by hinging knuckles, eyes or the like 31, which are engaged through said base frame side. As thus pivotally connected to one side of the base frame, said platform or pan extends laterally toward the opposite side of said base frame, but so that its free end terminates short of the latter. The platform or pan 30 is of a width to substantially cover the interior of the base frame 11 between the rods or shafts 14 and 15 by which the movable trapping jaws are pivotally connected with said base frame, thus providing a platform or pan area of such extent that likelihood of an animal overstepping the same, when entering or attempting to pass through the trap, is avoided. Formed in connection with the free end of the platform or pan 30 is an upstanding perforate coupling lug 32 to which is pivotally connected, by an eye 33 or other suitable coupling means, a trigger rod 34. Provided in a side of the movable trapping jaw 17, which is adjacent to the free end of the platform or pan 30, is a trigger rod receiving opening 35.

When it is desired to hold the erected and set movable trapping jaws 16 and 17 in a trippable condition, the trigger rod 34 is up swung and its free end portion 36 inserted through the receiving opening 35, whereupon the tie hook element 26, which extends from the upraised end of the trapping jaw 17, is engaged over the adjacent upraised end of the trapping jaw 16, and its elongated free end portion 28 extended to and its terminal hook-like bill 29 engaged around the thus disposed trigger rod (see Figs. 1 to 4 inclusive). When the holding or detent means and the trigger rod are thus engaged, the tensional down thrust of the movable trapping jaws 16 and 17 will be arrested, and a frictional resistance to accidental withdrawal of the trigger rod 34 from the receiving opening 35 will be set up. When the trigger rod 34 is raised and engaged in the receiving opening 35, the former will uphold the platform or pan 30 uptilted and well spaced above the surface upon which the base frame 11 of the trap is supported, so that said platform or pan 30 is disposed subject to down swing or depression under the weight of an animal when said animal enters the trap and steps upon said platform or pan (see Fig. 3).

The disposition of the set trigger rod 34 is such as to leave unobstructed both the lateral and longitudinal openings between the erected and set movable trapping jaws, and consequently longitudinal passage (see Fig. 5) or lateral passage (see Fig. 6) of an animal into the trap is unimpeded. Furthermore, the disposition of the set trigger rod 34 is such that, when the trap is sprung by an entering animal, likelihood of the released trigger rod striking and pushing the animal out of the trap is also avoided.

If an animal enters the set trap from any direction, as soon as its weight bears upon the platform or pan 30 the latter will be depressed and down swung, thus exerting a longitudinal downward drag upon the trigger rod 34, so that said rod is immediately withdrawn from the receiving opening 35 and thus yields to the pull of the holding or detent means resulting in disengagement from the latter. When the holding or detent means is thus freed, the down thrust exerted by the actuating springs upon the movable trapping jaw 16 will kick away said holding or detent means, so that both said jaw 16 and the movable trapping jaw 17 are released from restraint and subject to be quickly and forcibly down swung by said springs toward the stationary trapping jaws 12 and 13, so that one or both of said movable jaws will strike and inescapably grip the animal between the same and the cooperative stationary gripping jaw or jaws, whereby to securely trap and hold the animal against escape.

Since the release of the trigger rod 34 from the receiving opening 35 is effected by downward longitudinal drag thereupon which is exercised by the depressed platform or pan 30, the trap is very sensitive to trapping or springing action, since it takes up little force to overcome the frictional resistance set up between the end of the trigger rod and the sides of the receiving opening 35.

It will be obvious that the novel trap, characterized as above described, may be made in various sizes according to the size of animals desired to be caught.

Having now described my invention, I claim:

An animal trap comprising a hollow base frame the opposite end portions of which provide stationary trapping jaws, a pair of longitudinally spaced, oppositely extending and crossed movable trapping jaws respectively pivotally connected with the sides of the base frame inwardly of the respective stationary jaw forming portions thereof, the free end portion of one movable jaw being adapted to extend through and across the free end portion of the other movable jaw when said movable jaws are upswung to divergently inclined set positions, whereby an animal may pass into the trap and beneath said set movable jaws either longitudinally of or laterally between the latter, actuating spring means for the movable jaws adapted to exert down thrust thereof respectively toward respective stationary jaws, a tie hook element pivotally connected with the free end portion of one movable jaw and adapted to engage around the free end portion of the other movable jaw, a depressible platform within the base frame intermediate the movable jaws, a trigger rod connected with said platform for upward extension therefrom, one of said movable jaws having a receiving opening therein into which the free end portion of the trigger rod is insertable, and the free end portion of said tie hook element terminating in a hook-like bill adapted for releaseable engagement with the set trigger rod whereby to hold the upraised movable jaws in trippable condition.

LOUIS J. DE VORSEY.

REFERENCES CITED

The following references are of record in the file of this patent:

UNITED STATES PATENTS

| Number | Name | Date |
| --- | --- | --- |
| 288,182 | Morris | Nov. 6, 1883 |
| 1,149,190 | Ellison | Aug. 10, 1915 |
| 2,273,738 | Taylor | Feb. 17, 1942 |